United States Patent [19]
Stein et al.

[11] Patent Number: 5,664,103
[45] Date of Patent: Sep. 2, 1997

[54] SYSTEM FOR USING AN INDEPENDENT MEDIATOR FOR MONITORING CONTROL DATA AND TRANSFERRING SELECTED CONTROL DATA TO A REMOTE COMPUTER FOR CONCURRENT PROCESSING

[75] Inventors: Jan Stein, Wantagh; Constance Carlson, Clinton Corners, both of N.Y.

[73] Assignee: NYNEX Science & Technology, White Plains, N.Y.

[21] Appl. No.: 47,235

[22] Filed: Apr. 14, 1993

[51] Int. Cl.⁶ .................... G06F 3/14; G06F 15/163
[52] U.S. Cl. .................. 395/200.35; 395/200.78; 395/680; 395/683
[58] Field of Search ............... 395/200, 200.03, 395/200.04, 200.05, 200.12, 200.09, 200.11, 200.02, 200.19, 680, 683, 682

[56] References Cited

U.S. PATENT DOCUMENTS

| | | | |
|---|---|---|---|
| 4,754,428 | 6/1988 | Schultz et al. | 395/200.18 |
| 5,206,934 | 4/1993 | Naef, III | 395/200 |
| 5,241,625 | 8/1993 | Epard et al. | 395/163 |

OTHER PUBLICATIONS

Rooms: The Use of Multiple Virtual Workspaces To Reduce Space Contention in a Window-Based Graphical User Interface, D. Austin Henderson, Jr. and Stuart K. Card, Xerox Palo Alto Research Center, 1986.

Design for conversations: lessons from Cognoter, Deborah G. Tatar and Daniel G. Bobrow, Xerox Palo Alto Research Center, 1990.

rIBIS: a real-time group hypertext system, Gail L. Rein and Clarence A. Ellis, Microelectronics and Computer Technology Corporation, 1990.

Structure and support in cooperative environments: the Amsterdam Conversation Environment, Elizabeth A. Dykstra, Universiteit van Amsterdam, The Netherlands, 1990.

Toward An Open Shared Workspace: Computer And Video Fusion Approach of Teamworkstation, Hiroshi Ishii and Naomi Miyake, Communications of the ACM, Dec., 1991.

Stimulating Keyboard Input Between Programs Requires A (Key) Stroke of Genius, Jeffrey Richter, Microsoft Systems Journal, Dec., 1992.

Primary Examiner—Thomas C. Lee
Assistant Examiner—D. Dinh
Attorney, Agent, or Firm—Charles Ruggiero; Loren C. Swingle

[57] ABSTRACT

The present invention which is an interactive communication system includes a specialized software or programming system to function in a general field known as intelligent tutoring, which is a promising means of delivering instructions on procedural skills relating to programming and like subjects. What has been developed is integrated distance learning tutor (IDLT) techniques involving the specialized programming, and which inexpensively integrates the concepts of "shared work space" and distance learning technology for a PC based intelligent tutoring systems.

8 Claims, 10 Drawing Sheets

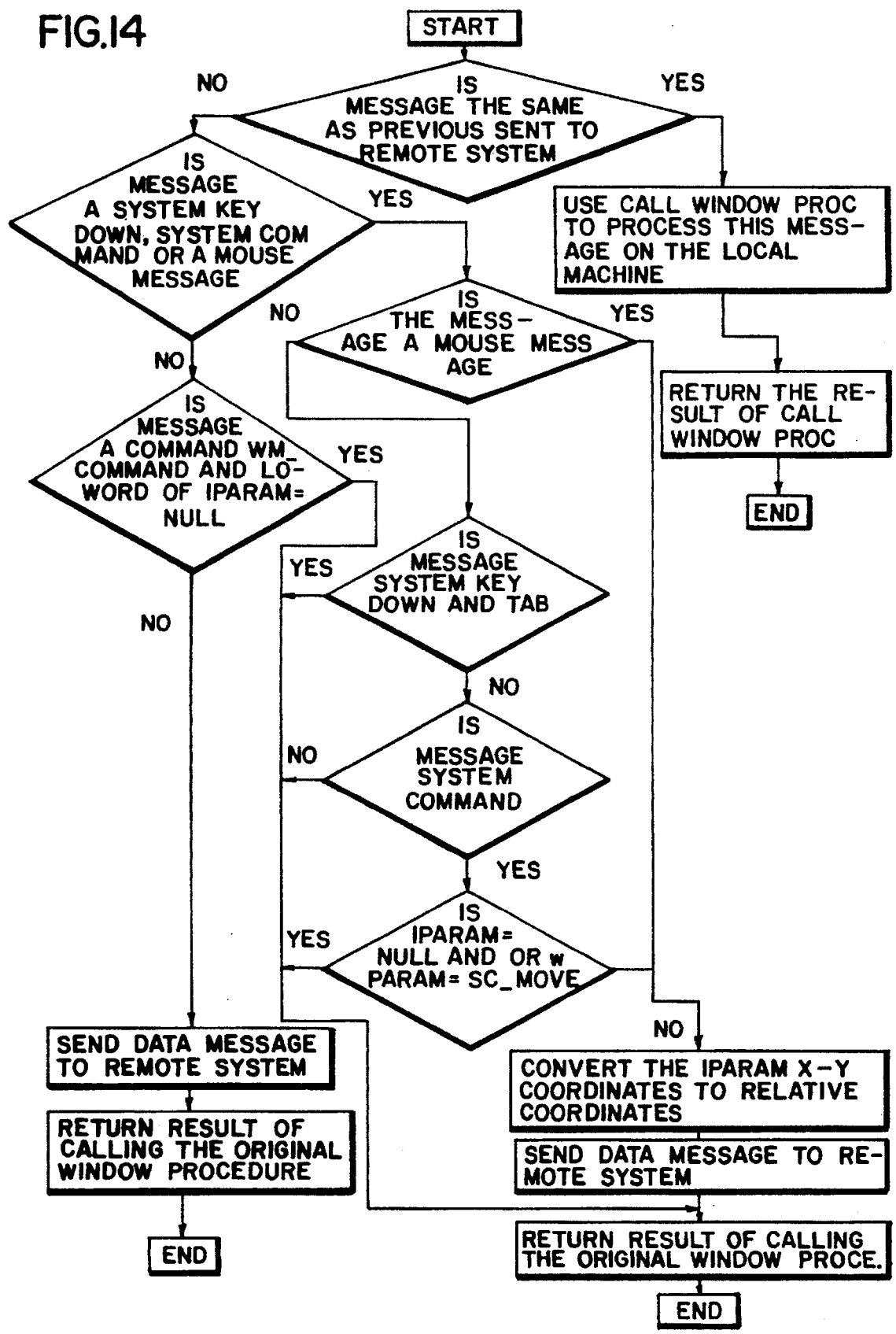

SYSTEM FOR USING AN INDEPENDENT MEDIATOR FOR MONITORING CONTROL DATA AND TRANSFERRING SELECTED CONTROL DATA TO A REMOTE COMPUTER FOR CONCURRENT PROCESSING

This invention relates to an interactive computer communication system and more particularly to a program means, or software, particularly adapted for use in connection with graphical user interfaces. The software uniquely exploits the message based nature of graphical user interface environments, such as, Microsoft® Windows™, IBM® OS/2™, and Apple® Macintosh® operating systems.

BACKGROUND OF THE INVENTION

Industries are increasingly being faced with the need to reduce costs while providing effective instruction. One of the major costs in delivering instruction is travel. Either an instructor must be sent to a worksite or all the students must travel to a training center, often for days or weeks. Two of the concepts which are being actively pursued as possible solutions to the travel problem are the placing of computerized training in the workplace and setting up satellite links for delivering lectures to multiple remote sites. So called distance teaming techniques need to provide a means of remote access to an instructor and a way of delivering declarative information efficiently. Distance teaming generally is used to refer to remote links between an instructor and students. These links are often through expensive satellite down links offering one way video and two way audio, and occasionally, two way video. While these links are useful for delivering information and some discussion, they are not well suited for teaching declarative skills that require extensive practice.

It also turns out from various studies that have been made that many training centers are spending large amounts of money on the aforesaid video and audio equipment to achieve at best the same levels of effectiveness that occur in the typical classroom.

Accordingly, it is a primary object of the present invention to provide a real time interactive computer system that will enable training more people with fewer instructors at a time when the general skill level of incoming employees is declining and the skill requirements are increasing. Said system can employ, but does not require, expensive video and audio equipment.

Another object is to meet the challenge of reducing training costs and increasing speed and effectiveness.

In considering and analyzing the objects, advantages and features of the present invention, it is well for the person skilled to the art to recognize that the present invention falls into the general field of what is called distance learning, as noted previously. For an appreciation of the various concepts and techniques already known in this field or domain, reference may be made to the following articles:

(1) Rooms: The Use of Multiple Virtual Workspaces To Reduce Space Contention In A Window-Based Graphical User Interface. D. Austin Henderson, Jr., and Stuart K. Card, Xerox Palo Alto Research Center, 1986; (2) Design for Conversation: Lessons from Cognoter, Deborah G. Tatar, and Daniel G. Bobrow, Xerox Palo Alto Research Center, 1990; (3) rIbis: A Real-Time Group Hypertest System, Gail L. Rein and Clarence A. Ellis, Microelectronics and Computer Technology Corporation, Austin, Tex., 1990; (4) Structure and Support In Cooperative Environments: The Amsterdam Conversation Environment, Elizabeth A. Dykstra, Universiteit van Amsterdam, The Netherlands, 1990; (5) Toward An Open Shared Workspace: Computer And Video Fusion Approach of Teamworkstation, Hiroshi Ishii, and Naomi Miyake, Communications of the ACM, December, 1991; (6) Stimulating Keyboard Input Between Programs Requires A (Key)Stroke of Genius, Jeffrey Richter, Microsoft Systems Journal, December, 1992.

The first article cited above describes Rooms as a window manager that overcomes small screen size by exploiting the statistics of window access, dividing the users workspace into a suite of virtual workspaces with transitions among them. The second article describes an ability to create a more realistic model of the situation that users faced in the design of software, that is, they encounter difficulties coordinating their conversational actions. This led to redesign of the Cognoter, a multi-user idea organizing tool. The third article describes a real-time group hypertext system, which allows a distributed set of users to simultaneously browse and edit multiple views of a hypertext network. The fourth article describes theory and concepts in designing a synchronous shared workspace to support human interaction and a description of such a system. The fitch article describes computer-based approaches to try to bridge a gap between computer support A and telecommunication support C by enhancing computer programs, so that data and programs can be used by a group in real-time collaboration. The sixth article describes how one application can simulate keystrokes to another application in the Microsoft® Windows™ operating system.

All of the above noted articles relate in one way or another to the integrated distance learning tutor concept and to related concepts, such as, shared work space. The fundamental problem that has arisen is that distance learning systems, in general, have been used with mixed results for primary and secondary education and college courses as a solution to the travel problem; however, interaction is very limited. Even with two way video, there is only one instructor for many students and they are separated possibly by hundreds of miles.

It will be understood that the system of the present invention does not include all of the components of the full integrated distance learning tutor (IDLT) system as generally described in periodicals appearing in the literature—involving as they do the aforenoted two way video. We believe that, at least for training purposes, two way video is often superfluous and can even be detrimental. Therefore, our tutor supports the student and instructor dialogues for a single audio and data link, preferably over a regular copper phone line. It should also be noted that while video may be used for showing external objects, such as, switches, we find that allowing the instructor and student to see the work station screen is the critical characteristic.

SUMMARY OF THE INVENTION

In fulfillment of the above stated objects and advantages, the system of the present inventions provides an important solution by serving as an unobstrusive intelligent manager of the interaction between application software and the operating system. As it is understood by those skilled in the art, there are two fundamental types of programs, namely, application programs and operating system programs. It should be especially noted that in the lexicon of terminology used herein, "program means" shall be considered synonymous with the intelligent manager of the aforenoted interaction. This program means is capable of managing both off the shelf applications as well as those developed internally.

It will also be understood that the specialized program means to be described herein is essentially software that exploits the message based nature of graphical user interface environments like those previously indicated, namely, Microsoft Windows, IBM OS/2, and Apple Macintosh operating systems. Such systems provide usual input and control information to their applications (i.e., application programs) in the form of messages. These messages include, (1) keyboard input, mouse input (location, mouse button clicks), and (2) system control messages, such as, application activation and focus messages. Each message is encapsulated by the present system into a packet and is sent to a remote machine or computer where the message is translated and sent to the appropriate destination application.

Broadly described then, a major feature of the present invention is a system enabling integrated distance teaming comprising: (1) at least two computers located remotely from each other; (2) a transmission line connecting said computers; (3) program means resident in each computer for controlling the other, including means for sending control messages over said transmission line responsive to device input strokes, and means for sending system control messages in the form of application activation and focus messages, such that one of said computers controls which application program out of a group of programs is operative on the other computer, thereby effectively synchronizing applications programs on said computers.

Other and further objects, advantages and features of the present invention will be understood by reference to the following specification in conjunction with the annexed drawings, wherein like parts have been given like numbers.

BRIEF DESCRIPTION OF THE DRAWING

FIGS. 5–14 are flow chart diagrams which depict the program means, and, effectively, illustrate the operational steps of the method carried out by the computers, persuant to the instructions of the program means in accordance with the present invention.

DESCRIPTION OF PREFERRED EMBODIMENT

Before proceeding with a detailed description of a preferred embodiment of the present invention, it is well to define certain terms as used herein. It is well known that programs or program systems are divided into operating systems, such as, MS/DOS™ and application programs or systems, such as, the well known Word Perfect® word processing program. Another well known program Windows™ by Microsoft® is an extension to the MS/DOS operating system, and provides a multi-tasking graphical user interface (GUI) that allows application programs to interact with the user and with other application programs. Hereinafter the term "application" is used as a substitute for the term "application program".

As is also well known, but it may be well to repeat it here, the definition of "program" is an instruction or set of instructions for directing and controlling a computer in the general operations to be performed and in the accomplishing of particular tasks, for example, either directing the disk operating system or the performance of a task like word processing. (It will be manifest that a program, per se, has a literary aspect which, falls in the copyright domain. However, since a computer program has the ultimate, utilitarian object of controlling a computer, it constitutes a control means for causing the computer to perform an internal process involving a series of steps or operations).

It will be clear that application programs developed for the aforesaid environments, such as GUI, are event driven, which simply means that soft-ware or program actions are initiated by messages indicating either user or application events. By user events are meant those resulting from the user's manipulation of keyboard or a mouse or other hardware input devices. By application events are meant those resulting from program (software) messages, i.e., directions or instructions to perform certain actions. Whereas, traditional software is procedural in nature, event driven software is more comparable to that of operating system software or interrupt management routines.

Figure 1:
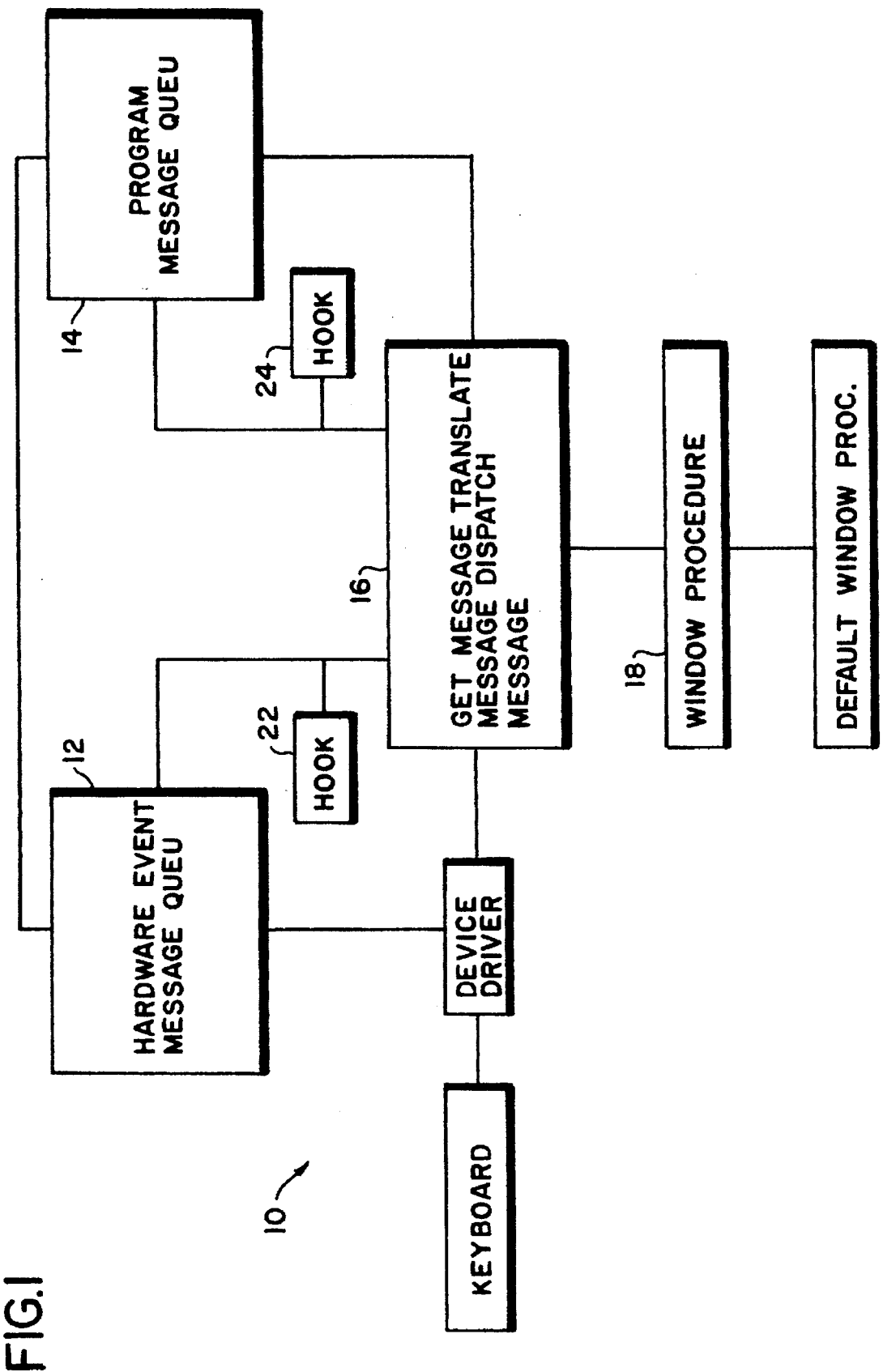
FIG. 1 depicts particular relationships between software components in program system means known in the prior art.

It will be understood by reference to FIG. 1 that a typical application for the Windows™ operating system consists of a message loop that gets a message from either the hardware event message queue 12 or the program message queue 14, (the latter being for messages posted to it from applications on the system, including itself), translates the message in accordance with means 16 (necessary for virtual keyboard processing, such as, Function Keys), and dispatches the message to a Window procedure 18 for processing. As will be appreciated then, FIG. 1 shows the relationship between the software components. When there are no more messages queued for the application it yields the processor (that is, a typical microprocessor, such as that seen in FIG. 4 which forms part of the computer or machine involved) to other applications running in the system. The two boxes 22 and 24 labeled "hook" represent individual software test points or connections to the system. For further details of program means and techniques related to those shown in FIG. 1, reference may be made to the book by P. Norton and P. Yao entitled, "Peter Norton's Windows 3.0 Power Programming Techniques", Bantum Books, 1990.

The software, that is, the particular program means developed in accordance with the present invention, takes advantage of the structure of a message passing system that is typical of graphical user interfaces. Of course, it will be understood that although these particular interfaces are involved in the particular embodiment under consideration, the software could just as well be employed with other equivalent interfaces or other applications. Specifically, the software of the present invention hooks into the hardware event queue 52 seen in FIG. 2 to retrieve raw keyboard and mouse events and the like. This is represented by the block 40, also seen in FIG. 2. Additionally, the software also chains the application's window procedure; this is commonly known as sub-classing.

Figure 2:
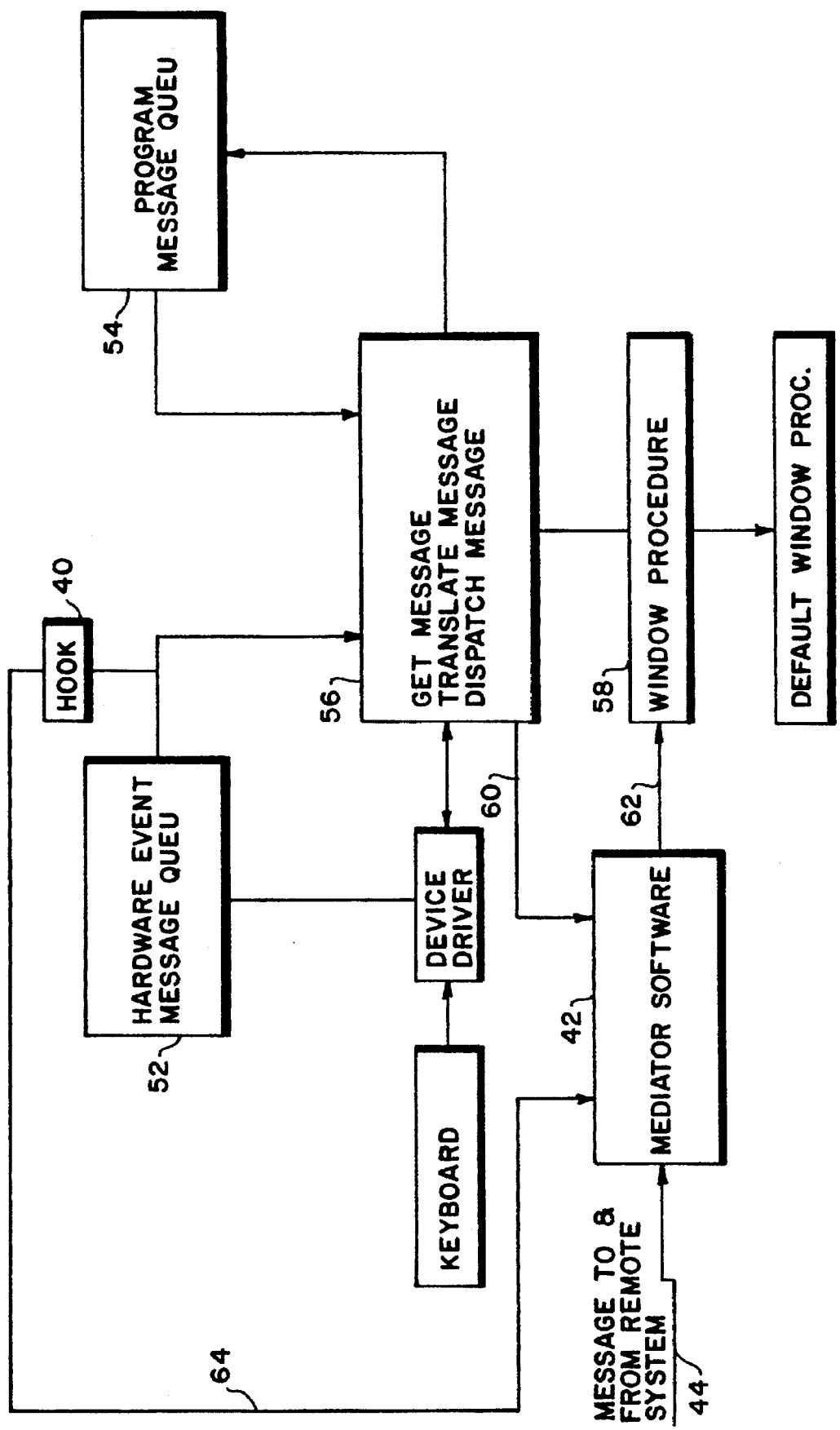
FIG. 2 depicts the relationship between components in the system of the present invention in which a particular, specialized software or programming means is included.

There will be seen in FIG. 2 the software or program means of the present invention, involving a specific relationship of the software components. FIG. 2 illustrates how this unique program means modifies the original relationship of the system software components previously seen in FIG. 1. The software 42 runs in the background; tapping into the messages by virtue of the hook 40 destined for the application (or application program) with focus,(i.e., the application on which the user is currently working). The software then formats these messages into packets, as will be understood, and transmits the packets to a remote system. It will be seen that the software 42 (suitably stored on a conventional hard disk or the like) functions to enable messages to be sent to a remote system, and messages to be received therefrom by means of the transmission link in the form of line 44.

The other components forming the software, or program means, are substantially the same as those seen in FIG. 1, and the counterpart elements to components 12, 14, 16, and 18, are herewith designated 52, 54, 56, and 58, respectively. In the case of the present invention, a special link 60 is provided between component 56 and the software 42. Likewise, link 62 between 42 and 58. Also, link 64 between 52 and 42.

It will be understood that the software of the present invention running on the remote system, (identically functioning in the manner of 42 in FIG. 2), strips out the message and sends it to the appropriate Window procedure (58 in FIG. 2). The software 42 determines the appropriate Window procedure by intercepting messages from the operating system that control which application is to have the focus (remembering that the term "focus" refers to the application on which the user is currently working). The software also filters messages and sends to the remote system only those required to replicate user interaction, i.e., to replicate at the other computer the particular user activity on the one computer.

Figure 3:
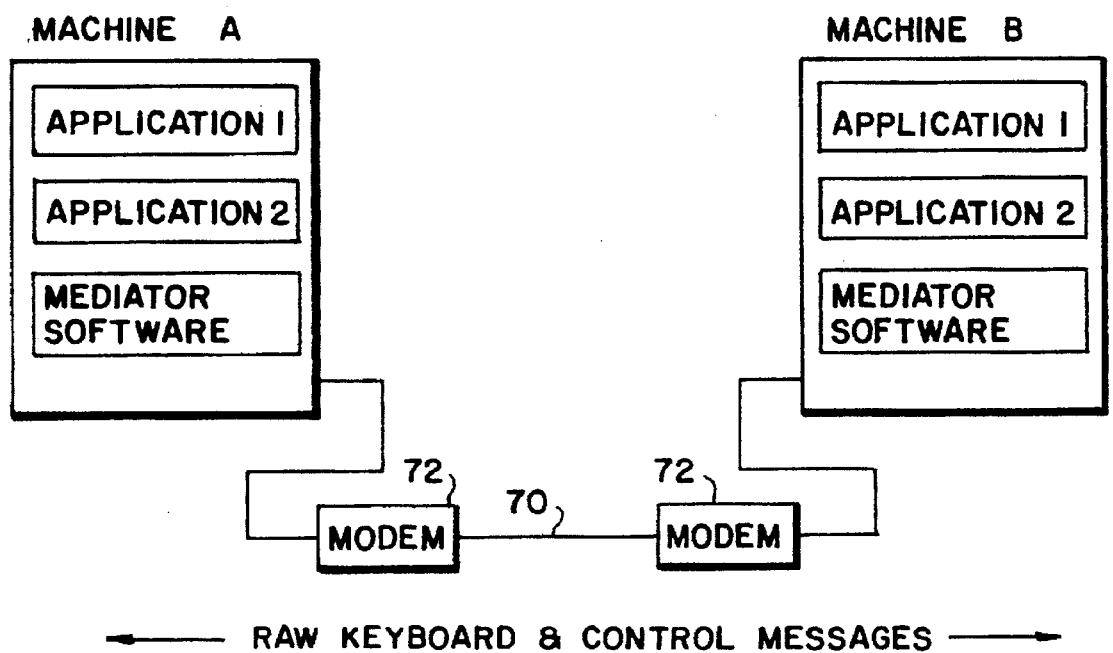
FIG. 3 illustrates a sample system configuration with two computers (machines) connected via an RS-232 serial line, each computer having two applications and with the specialized software (mediator) running on it.

FIG. 3 illustrates a sample configuration of what may be termed a distance tutoring system operating over a telephone line 70 and including well known modems 72 and other standard components by which machine or computer system A and machine or computer system B can communicate for distance tutoring purposes. In the example of FIG. 3, each machine is provided with two applications. For example, when the user on machine B clicks on application 2 for his operating system, the system generates control messages directing the application on which the user is currently working, (that is, the application with focus), to give up the focus to application 2. When these control messages are sent by way of line 70 to the mediating software on machine A, the very same action takes place on machine A. If the user types on machine B's keyboard, then the key stroke effects are sent to the mediating software on machine A. The mediating software on machine A forwards these messages to application 2 on machine A, giving the appearance that the same keys were typed on machine A's keyboard. The same scenario as described above occurs when the user on machine A types on his keyboard.

Figure 4:
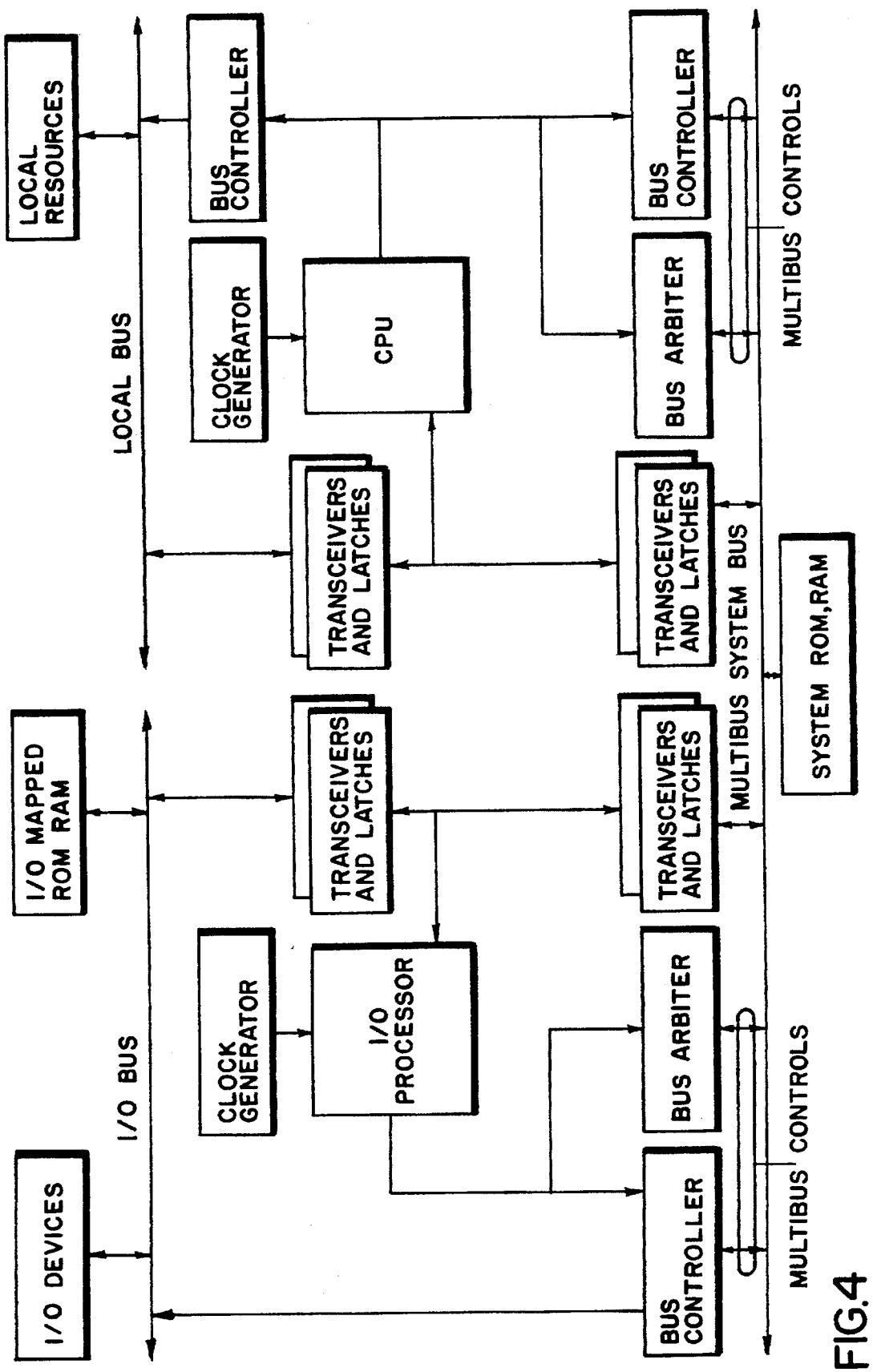
FIG. 4 is a schematic diagram of the computer in which the program means of the present invention is incorporated.

Referring to FIG. 4, there will be seen a block diagram of the essential or basic set of computer components forming the context of the present invention. It will be understood that in the present invention's interactive system all communications, including keyboard and mouse inputs are fed to the I/O devices seen at the upper left in FIG. 4, and that the unique mediator software resides in the system RAM seen at the bottom of this figure.

In order to furnish the man skilled in the art with a complete implementation of the principles of the invention, the following description of the software in textual and graphical (flow chart) form is provided:
INTRODUCTION The mediating (or Mediator) software is composed of three basic components: a library of communication routines, a library of functions used to filter data, and the main program. When started, the main program creates a window, does some initialization, and then waits for the user to invoke its capabilities. Once the user initiates a connection to another machine, the main program calls routines in the communication library to establish the link, and also calls routines in the filter library to establish a hook (test point) into the keyboard so that keystrokes can be captured. The main program then subclasses the local target application.

At this point the Mediator software has linked the same application on two separate machines. The input to one application will also appear as input to the other application.

Additionally, if focus changes to another application on one machine, the focus will also change to that application on the other machine. Auxiliary services such as file transfer between the machines is also possible.

The following descriptions and flow charts describe the Mediator software in greater detail and are organized according to software component (i.e.: communication library, filter library, and main program). The descriptions are written in a stepwise format and illustrated by the accompanying flowcharts.

Figure 5:
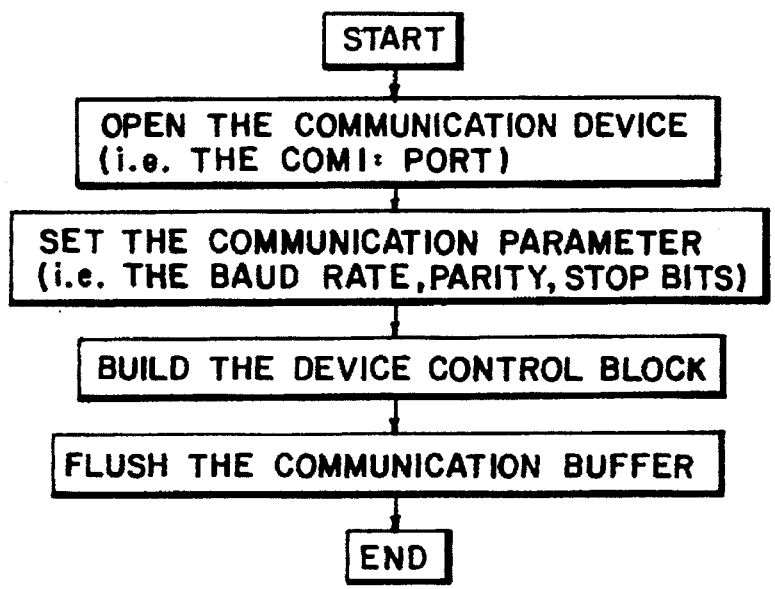
Figure 6:
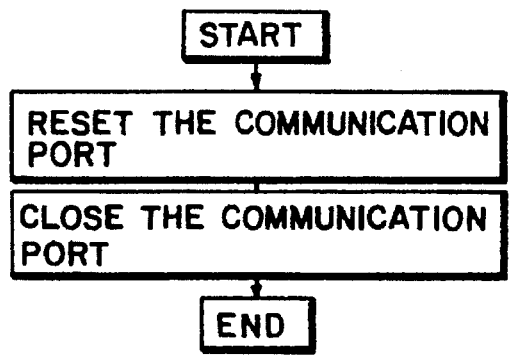
Figure 7:
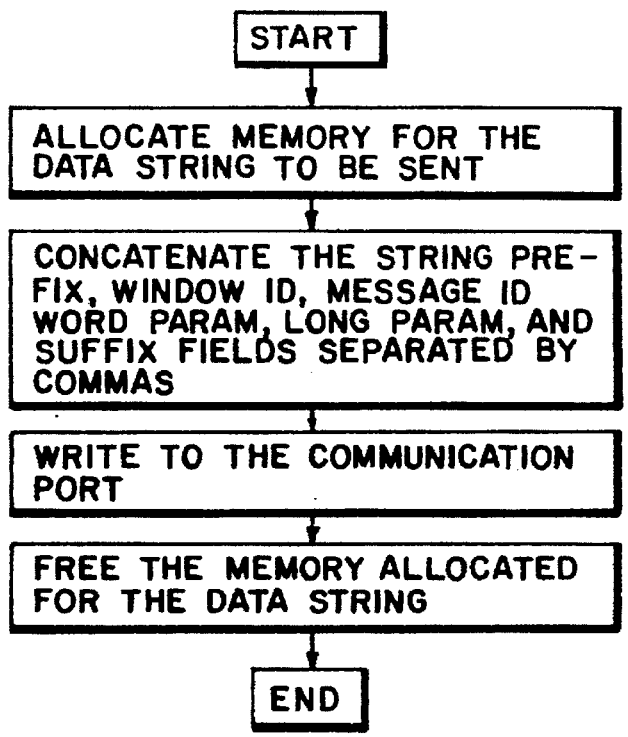

Communication Library (Refer to FIGS. 5,6,7)

The routines in this library are used to establish a link with another machine, send data to the other machine, and terminate the link with the other machine.
I. Communication Port Setup
   1. Open the communication device
   2. Set the Baud Rate Parity Data Bits and the number of stop Bits
   3. Build the Communication Device Control Block
   4. Flush the communication buffer.
II. Reset the Communication Port
   1. Close the communication port.
III. Send String to Remote System
   1. Allocate memory for the data string, prefix and suffix (i.e., the data pocket)
   2. Concatenate the strings
   3. Write to the communication port
   4. Free the allocated memory.

Figure 8:
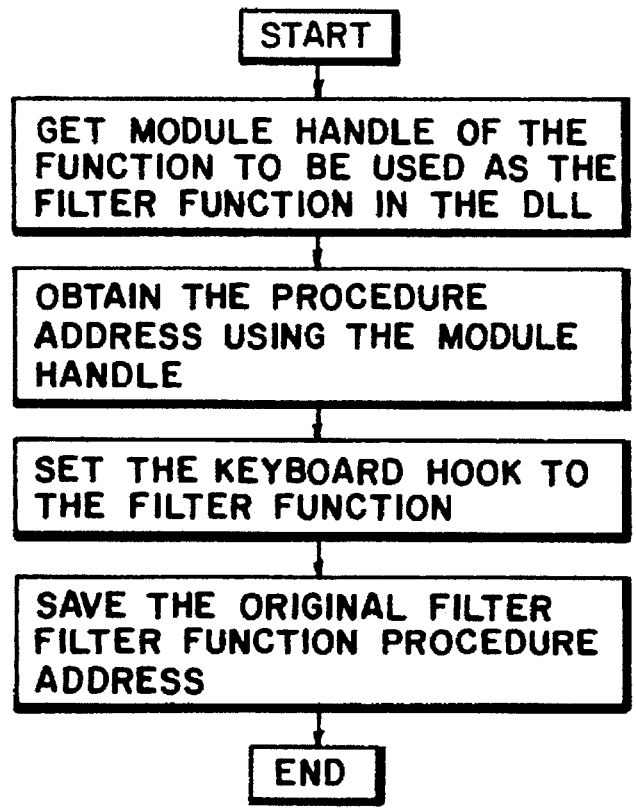
Figure 9:
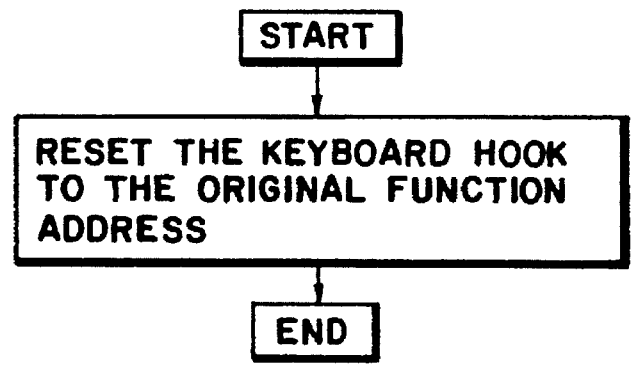

Filter Library (Refer to FIGS. 8,9)

The functions in this library install a keyboard hook, capture and filter keyboard messages, and remove the keyboard hook. For the Microsoft Windows operating system these routines must be in a Dynamic Link Library (DLL) (see *Microsoft Windows SDK Reference Volume* 1).
I. Setup
   1. Get the Module Handle (the Handle of the function to be used in this DLL)
   2. Use the Handle to obtain the procedure address of the function to be used
   3. Set the Keyboard Hook to this function.
Sample Code:
   In this example, the name of the DLL is "MY_FILT.DLL" and the function name is "KbdHook". The variable "lpOldFilterFunc" should be a global as it will be needed to unhook the keyboard when terminating.
      lpFilterFunc=(GetProcAddress(GetModuleHandle ("MY_FILT.DLL"), "KbdHook");
      lpOldFilterFunc=SetWindowsHook(WH_KEYBOARD, lpFilterFunc);
II. Unhook
   Unhooking the keyboard must be done to prevent the application from causing difficulties upon termination of the application. If the keyboard is not unhooked then keyboard events will call a function that is no longer in memory, causing the system to crash.

III. KbdHook

This is the keyboard hook function.

1. If the operating system identifies that the Hook function should process this message, then it sends this message to the mediator software for processing 2. Call DefHookProc (the operating system's Default Hook Procedure) with the pointer to the old filter function to handle the message.

Figure 10:
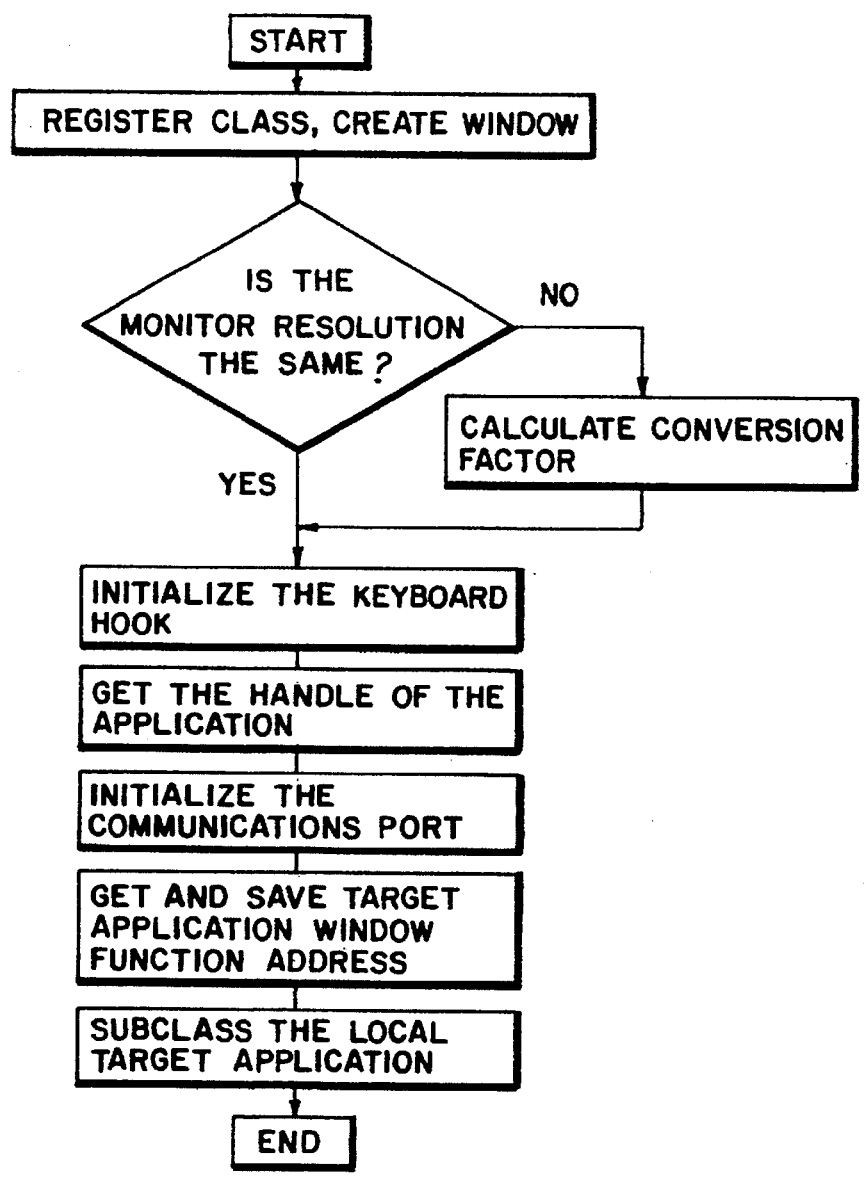
Figure 12:
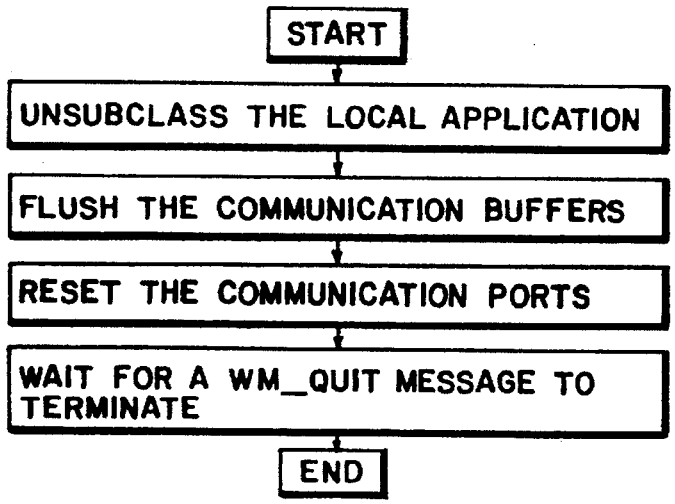
Figure 11:
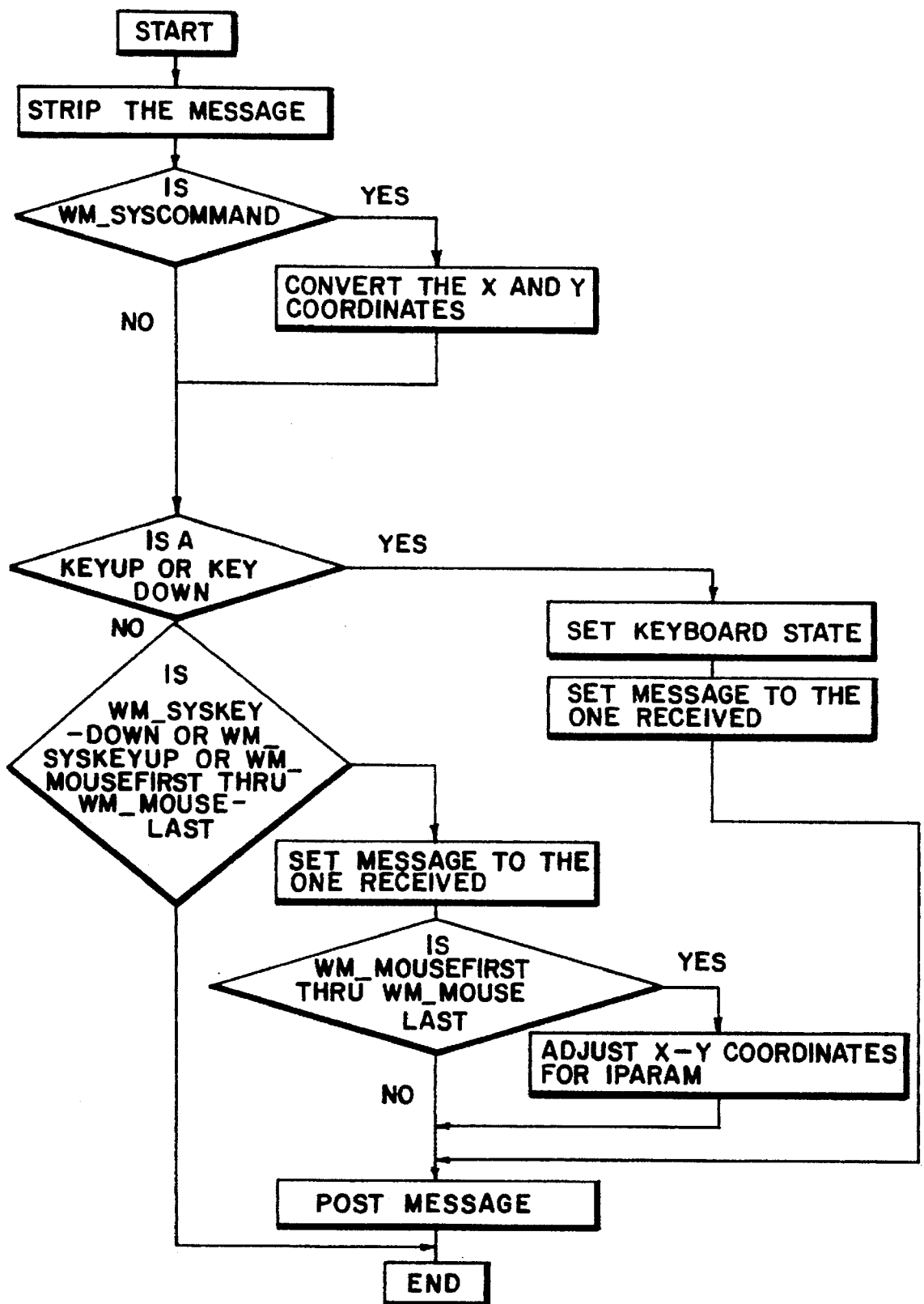

Main Program (Refer to FIG. 10 Initialization; FIG. 11 Renewed data from remote application and FIG. 12 Termination of application)

The main program is actually comprised of two window procedures. The main window procedure creates the Mediator window and responds to: menu selections by the user, data from the remote machine, and keystrokes intended for the local application. The linking window procedure is used in subclassing the local application with focus and forwarding those messages on to the remote machine in some cases, and in other cases taking appropriate action on the local machine. In both the main window procedure and the linking window procedure action is taken when the appropriate message is received by the application. Since this is an event driven system, no procedural order is implied in the listing of the messages within these procedures.

Main Window Procedure

I. WM CREATE

This message is generated by the operating system when a window is created.

1. If the system is to support monitors with different resolutions, the X and Y coordinate multipliers must be calculated for both sending and receiving messages in order to normalize the coordinates to VGA resolution. Otherwise, no special processing is necessary.

II. WM KBDHOOK (a user defined message)

The processing of this message takes the information received from the Keyboard Hook and creates a keyboard message to be sent to the remote system.

1. Determine the Message ID to be sent to the remote, if any, by the following process:
   a. If the message is a KEYUP and the message indicates a transition state (not the same as the previous key state) then set the Message ID to KEYUP
   b. Otherwise, if the message is a KEYUP and the message does not indicate a transition state then return FALSE and do not send a message to the remote system
   c. If the message is a KEYDOWN then set the Message ID to KEYDOWN 2. If the key state indicates that the ALT key (menu key) has placed the system in the menu state and this message is not a VK_MENU key, then return FALSE and do not send a message to the remote system 3. If the message (KEYUP or KEYDOWN) and the scan code of the key being pressed are the same as the previous then this is a feedback from the key just posted, therefore return FALSE and do not send a message to the remote system 4. If the keystrokes are coming from the Mediator application then return FALSE and do not send the messages to the remote system 5. Otherwise, assemble the message into the proper format and send it to the remote machine for processing.

III. IDM CONNECT

This message is generated by the user selecting a menu item that initiates the connection to the remote system.

1. Initialize Keyboard Hook

2. Get the Handle of the application to subclass (obtained either from the front end software application or can be predefined)

3. Obtain the Window Handle of the application on the remote machine with which local application will be collaborating 4. Initialize the communication port 5. Get and save the target applicant's Window Procedure function address 6. Set the Windows Procedure to Mediator's linking procedure via the SetWindowsLong command.

At this point all messages sent to the local target application will be processed by the Mediator's linking window procedure. It is now the responsibility of the Mediator software to forward all messages to the local target application's original window procedure. This is one reason why it is important to save the pointer to the local target application's original window procedure. Another reason is that upon termination the pointer to the local target application's original window procedure must be restored or both applications will crash.

IV. IDM RECV

This message is generated by the receipt of data via the communication port from the remote machine.

1. Strip message received

2. If the message received is a system command (WM_SYSCOMMAND) then convert the X and Y screen coordinates from the relative to the local screen coordinates using the multipliers calculated in the initialization phase 3. If the message is a KEYUP or KEYDOWN, then set the keyboard state to reflect the state of the key change 4. If the message is a system key down (WM_SYSKEYDOWN), a system command (WM_SYSCOMMAND), or a mouse message (WM_MOUSEFIRST through WM_MOUSELAST) then set the message to the one received 5. If the message is a mouse message (WM_MOUSEFIRST through WM_MOUSELAST) then adjust the long word parameter to contain the adjusted X and Y screen coordinates 6. Post the message to the target application to place the message in the application's message queue in order to process as if generated locally.

V. IDM EXIT

This message is generated by the user selecting a menu item to terminate the Mediator software.

1. Unsubclass the local target application's window procedure by resetting the pointer back to the original local target application's window procedure 2. Flush the communication buffers to clear any messages 3. Close and reset the communication port so that no more messages are received 4. Post a message to terminate the Mediator application (using PostQuitMessage(WM_QUIT) to allow the system to clean up).

Figure 13:
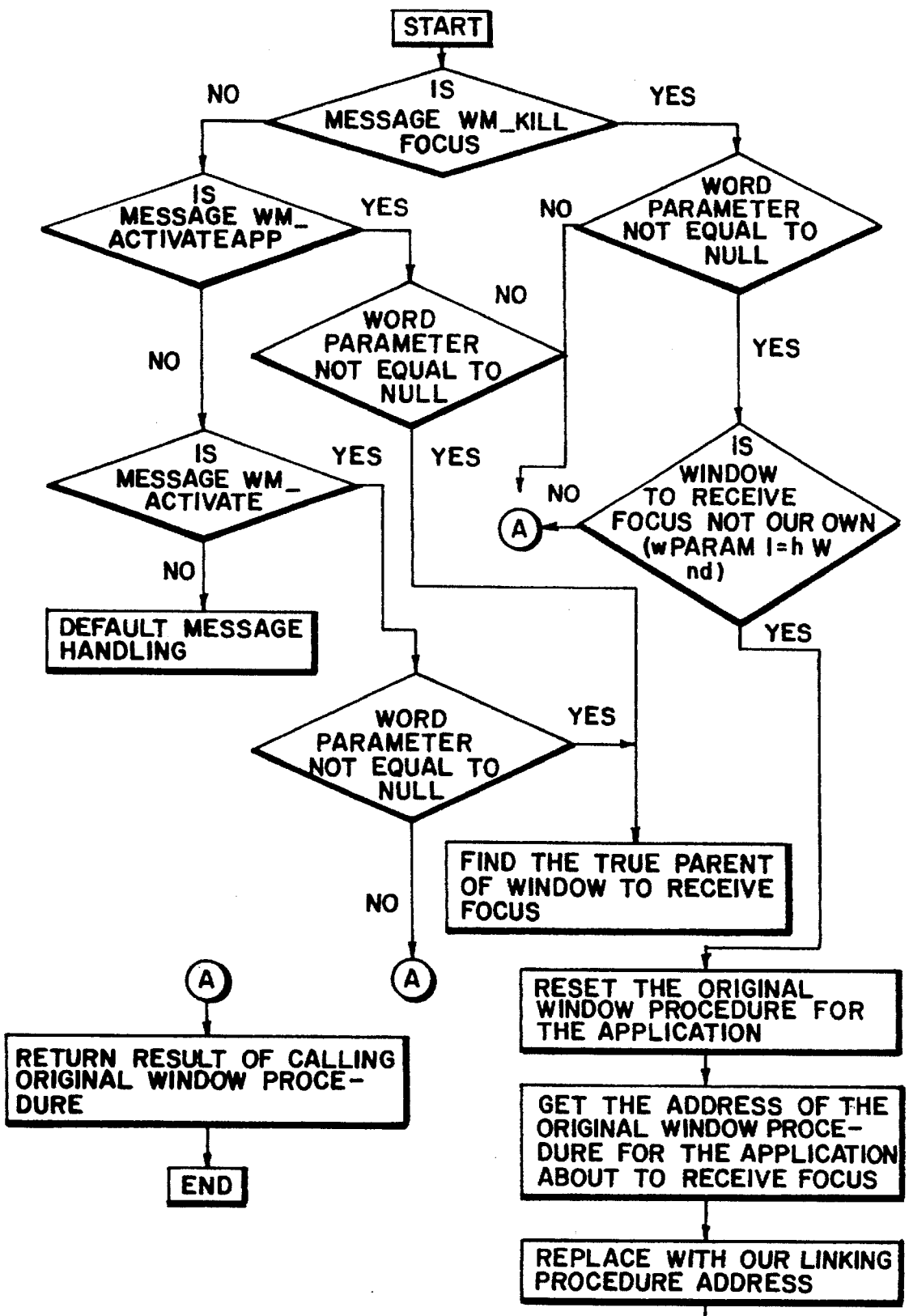

Linking Window Procedure (Refer to FIGS. 13, 14)

All Messages Except: WM_INIDIALOG, WM_KILLFOCUS, and WM_ACTIVATEAPP

1. If the message is the same as the last message, then this is a repeat of the previous command and it should not be sent to the remote system. It must, however, be processed locally and it should be forwarded to the local target application's window procedure via the CallWindowProc command 2. If the message is a system key down (WM_SYSKEYDOWN), a system command (WM_SYSCOMMAND), or a mouse message (WM_MOUSEFIRST through WM_MOUSELAST), then set the message to the one received 3. If the message is a mouse message then adjust the long word parameter to contain the adjusted X and Y screen coordinates 4. If the message is a system key down (WM_SYSKEYDOWN) and the key being pressed was a TAB key, then do not send the message to the remote system. Instead call the local target application's window procedure and using the result of that call then return 5. If the message is a system command (WM_SYSCOMMAND) and the long word parameter is either NULL or a move (SC_MOVE) then do not send the message to the remote system. Instead call the local target application's window procedure and using the result of that call then return 6. If the message is a system command (WM_SYSCOMMAND) and the long word parameter is neither NULL or a move (SC_MOVE) then adjust the X and Y screen coordinates from the actual screen coordinates to the relative screen coordinates 7. If the message is a command (WM_COMMAND) and the low word of the long word parameter is NULL, then do not send this message to the remote system. Instead call the local target application's window procedure and using the result of that call then return 8. Otherwise, if the message is a command (WM_COMMAND) and the low word of the long word parameter is not NULL, then convert the message to the packet format used to transmit data to the remote machine 9. Transmit the data packet to the remote system for processing 10. Call the local target application's window procedure and using the result of that call then return.

WM_KILLFOCUS

1. If the word parameter is not NULL, then this application is losing focus to the application specified in the word parameter. The program restores the original window procedure function pointer (i.e., unsubclasses) the local target application 2. If the window receiving focus is not the Mediator application, then subclass the application that received focus.

WM_ACTIVATEAPP

1. If the word parameter is not NULL, then low word of the window parameter contains the task handle of the application being activated by the system. The Mediator software should subclass the application indicated in the message 2. Find the true parent window of this window 3. Subclass the application 4. Send a message to the remote system requesting it to subclass the named application.

WM_ACTIVATE

1. If the word parameter is not NULL, then low word of the window parameter contains the task handle of the application being activated by the system. The Mediator software should subclass the application indicated in the message 2. Find the true parent window of this window 3. Subclass the application 4. Send a message to the remote system requesting it to subclass the named application.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. A system for enabling interactive, distance learning comprising:

at least first and second computers located remotely from each other, each said computer having an operating system and a currently active common application program;

first control means associated with said first computer for transmitting certain control data to said active common application program on said first computer;

a transmission line connecting said first and second computers;

mediator software means, independent of said active common application program, resident in said first computer, coupled to said first control means in common with said active common application program, for controlling said second computer, said mediator software means monitoring said certain control data transmitted to said active common application program on said first computer, and in response to a detection of selected control data, causing operating system control messages which correspond to said selected control data to be transmitted over said transmission line to said second computer to enable said selected control data to be reproduced at said second computer for use by said common application program.

2. The system as defined in claim 1, in which said mediator software means causes transmission of said operating system control messages in unencoded form.

3. The system as defined in claim 1, wherein each of said operating system control messages includes an activation and focus message that identifies said active common application program on said second computer, whereby the operations of said computers are synchronized on a real time basis.

4. The system as defined in claim 1, wherein said second computer includes means for reproducing said selected control data from said operating system control messages received from said first computer.

5. The system as defined in claim 1, wherein said active common application program on said first computer corresponds to said active common application program on said second computer, and an input to said active common application program on said first computer also appears as a similar input to said active common application program on said second computer.

6. The system as defined in claim 1, in which said second computer includes means for stripping out said selected control data from said operating system control messages received from said first computer and sending said selected control data to an appropriate window procedure.

7. The system as defined in claim 1, wherein:

said active common application program on said first computer is capable of receiving said selected control data; and said mediator software means intercepts said selected control data directed to said active common application program on said first computer and generates said operating system control messages responsive to said selected control data.

8. The system as defined in claim 1, wherein:

said active common application program on said second computer is capable of receiving said selected control data that is reproduced at said second computer; and said selected control data is processed by said active common application program on said second computer so that said mediator software means, which enables said selected control data to be reproduced at said second computer, effectively controls said second computer.

* * * * *